United States Patent [19]

Green

[11] Patent Number: 5,598,293
[45] Date of Patent: Jan. 28, 1997

[54] ELECTROCHROMIC GLASS FOR USE IN CARS AND BUILDINGS

[75] Inventor: Mino Green, London, United Kingdom

[73] Assignee: Societa Italiana Vetro - SIV - S.p.A, San Salvo, CH, Italy

[21] Appl. No.: 526,322

[22] Filed: Sep. 11, 1995

Related U.S. Application Data

[63] Continuation of Ser. No. 185,381, Jan. 24, 1994, abandoned.

[30] Foreign Application Priority Data

Jan. 22, 1993 [IT] Italy ................ RM93A0028

[51] Int. Cl.$^6$ ................................. G02F 1/153
[52] U.S. Cl. ................ 359/275; 359/273; 359/270
[58] Field of Search ................ 359/269, 275, 359/265, 273

[56] References Cited

U.S. PATENT DOCUMENTS

| | | | |
|---|---|---|---|
| 3,973,829 | 8/1976 | Giglia | 359/269 |
| 4,120,568 | 10/1978 | Deb et al. | 359/275 |
| 4,537,826 | 8/1985 | Miyamura et al. | 359/265 |
| 4,671,619 | 6/1987 | Kamimori et al. | 359/275 |
| 4,761,061 | 8/1988 | Nishiyama et al. | |
| 4,824,222 | 4/1989 | Green | 359/275 |
| 5,138,481 | 8/1992 | Demiryont | 359/269 |
| 5,142,406 | 8/1992 | Lampert et al. | 359/275 |
| 5,151,816 | 9/1992 | Varaprasad et al. | 359/265 |
| 5,274,493 | 12/1993 | Couput et al. | 359/275 |

FOREIGN PATENT DOCUMENTS

| | | |
|---|---|---|
| 0098416A3 | 1/1984 | European Pat. Off. . |
| 2858076C2 | 10/1978 | Germany . |
| 3629879A1 | 3/1987 | Germany . |
| WO89/10578 | 11/1989 | WIPO . |
| WO93/04507 | 4/1993 | WIPO . |

OTHER PUBLICATIONS

"Electrochromic Materials and Devices for Energy Efficient Windows" Lampert, Solar Energy Materials; North–Holland.
Patent Abstracts of Japan, vol. 5, No. 154 (P–082) Sep. 29, 1981 (Abstract of JP 56–085737).
O. Bohnke et al., *J. Electrochem. Soc.*, vol. 139, No. 7, pp. 1862–1865 (1992).
Patent Abstracts of Japan, vol. 13, No. 401 (E–816), Sep. 6, 1989 (Abstract of JP–A–01144562).
Patent Abstracts of Japan, vol. 6, No. 88 (P–118) (966), May 26, 1982 (Abstract of JP 57–23920).
Kirkman, *IBM Technical Disclosure Bulletin*, vol. 19, No. 6, p. 2233 (1976).

*Primary Examiner*—Paul M. Dzierzynski
*Assistant Examiner*—Audrey Chang
*Attorney, Agent, or Firm*—Wenderoth, Lind & Ponack

[57] ABSTRACT

An electrochromic glass of a size suitable to be used with advantage in automobile or building applications, made from two sheets of glass and as external walls, two transparent conductor layers and two electrodes as the system's active elements and an electrolyte polymer. The active electrode is made of tungsten oxide, whereas the active electrode is made of vanadium oxide or a suitable mixture of vanadium oxide and molybdenum oxide. The electrolyte polymer is obtained by dissolving lithium perchlorate in a suitable solution of propylene carbonate and polymethylmethacrylate. A suitable reference electrode keeps the system under control. The complex formed as above is capable of rapidly becoming dark or transparent under the action of an electric field.

4 Claims, 1 Drawing Sheet

ELECTROCHROMIC GLASS FOR USE IN CARS AND BUILDINGS

This application is a continuation of now abandoned application Ser. No. 08/185,381, filed Jan. 24, 1994.

FIELD OF THE INVENTION

1. Background of the Invention

The present invention relates to a transparent electrochromic device particularly suitable for use in the fields of building and automobile construction as a window capable of varying its light transmission in response to the application of an electric field.

In the following description this device will be called an electrochromic glass: it is a complex formed by sheets of glass joined together along with suitable conductor elements.

Electrochromic glass represents an important step forwards in the use of glass, both in the field of building construction and in the car industry, as glass of this kind can modify its transparency as required, when an electric field is applied for a specified time.

2. Description of the Prior Art

An example of an electrochromic device which has been on the market for years is that of the displays used in digital watches.

An electrochromic glass capable of being used in the field of building construction, for example as a window, or in the car industry, for example as a transparent sunroof, is much larger in size than watch displays and must guarantee adequate transparency; furthermore the variation in colour, that is to say the passage from a dark state to a transparent state and vice versa, must take place not only with sufficient rapidity, but also in a uniform manner all over the surface.

One problem, which is a direct consequence of the large size of glass used for building and cars when compared to displays, is that it is very difficult to obtain uniform colouring over the whole surface within a sufficiently short time; furthermore, in case of large surfaces this lack of uniformity is clearly visible, causing problems of a functional nature as well as being unattractive from an aesthetic point of view.

Summary of the Invention

An object of the present invention is therefore to overcome, the above mentioned problem, providing an electrochromic device that allows uniform colouring of the whole surface area within a sufficiently short space of time, thus allowing it to be used in large elements for the field of car manufacture and building construction.

The object of the present invention is achieved thanks to the use, in the construction of the electrochromic device, of a plurality of suitably chosen and combined elements: a suitably prepared electrolyte polymer is, in fact, used, with a conductivity sufficiently high that it prevents the colourant ion concentration being drastically depleted during the colouring phase and therefore helps to maintain uniform colouring; transparent conductor substrates with a resistivity not exceeding 20 ohms per square are used; Tungsten oxide ($WO_3$) is used as the material for a first active electrode capable of accepting and returning the colorant ion (lithium) in the amount required; Vanadium oxide or a suitable mixture of Vanadium oxide/Molybdenum oxide ($nV_2O_5/MoO_3$) is used as the material forming a second active electrode; lithium is incorporated into one or other of the active thin films preferably by an electrochemical method; furthermore, a reference electrode is used so as not to exceed specific potential limits, in order to guarantee long life for the cell; suitable sealing materials are used, capable of sealing the walls of the device thus formed.

BRIEF DESCRIPTION OF THE DRAWING

Further characteristics and advantages of the invention will be better understood with the aid of the following drawing and example, given merely as a non-limiting example.

PREFERRED EMBODIMENT

Figure 1:
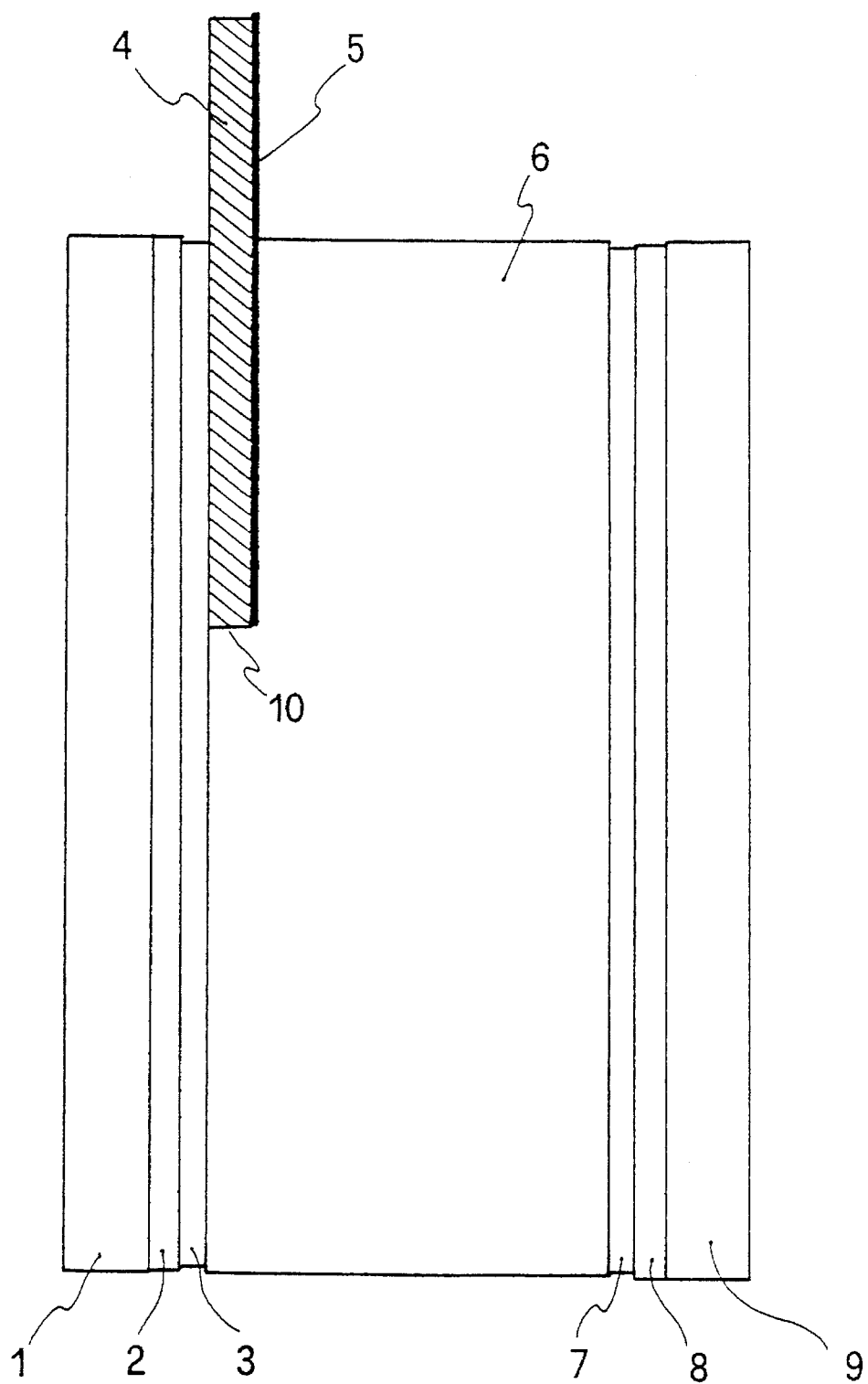
FIG. 1 is a cross-section view of the electrochromic glass manufactured according to the present invention.

With reference to FIG. 1, the electrochromic glass object of the present invention is made up of two transparent substrates 1 and 9 coated, on their inner surfaces, with a thin layer 2 and 8 of tin oxide or of a mixture of indium oxide and tin oxide.

The resistance value of said thin layers is preferably between 15 and 20 ohms per square.

If necessary, thin lines of metal, for example silver, can be used, applied for preference using screen-printing techniques, in order to further reduce the resistance value of said conductor layers.

The transparent active electrodes 3 and 7 are formed, respectively, layer 3 by a thin layer of tungsten oxide with a thickness of between 2500 and 7000 Å and layer 7 by a thin layer of vanadium oxide with a thickness of between 1000 and 3000 Å, or by a thin layer of $nV_2O_5/MoO_3$ in which n can take on any value from 0.3 to infinity.

Said active electrodes are preferably deposited using the evaporation process, in particular layer 3 is deposited on layer 2, whereas layer 7 is deposited on layer 8.

One of the two complexes thus formed, made up respectively of substrate 1, conductor layer 2 and active electrode 3, or of substrate 9, conductor layer 8 and active electrode 7, is submerged in a suitable electrolyte solution of lithium perchlorate in order to insert the lithium into the active electrode.

A spreadable electrolyte polymer 6 is then deposited, using screen-printing methods, on the surface formed by electrode 3.

Said electrolyte polymer is obtained by dissolving lithium perchlorate in a solution of polymethylmethacrylate and propylene carbonate, the latter mixed in such a way that the ratio by weight of propylene carbonate to polymethylmethacrylate is between 2.5 and 3.5. Hot vacuum treatment then reduces the ratio by weight of propylene carbonate to polymethylmethacrylate to values of between 1.5 and 1.8.

Again with reference to FIG. 1, a reference electrode 10 is inserted between layer 3 and the electrolyte polymer 6.

Said electrode is preferably made up of a thin plate of polyethylene terephthalate 4, one surface of which is covered with a layer of gold 5, deposited on said plate using any one of the known methods for depositing thin layers.

The strip is for preference between 0.5 and 2 mm wide, and is inserted between the conductor layer 3 and the electrolyte 6 for a length not exceeding 20 mm; the thin layer of gold 5 is placed in contact with the electrolyte 6.

The total thickness of said strip forming the reference electrode is for preference chosen so that it does not exceed 10% of the thickness of the electrolyte 6.

Furthermore, the distance between the long side of the strip 4 and the edge of the glass parallel to said side is for preference between 7 and 15 mm.

Said reference electrode 10 has the job of controlling that the potential of the active electrode 3 does not exceed working limits, which are for preference between −1.2 volts and +1.2 volts.

When, within the above indicated limits of voltage range, an electric supply is used feeding a constant current, the colouring of the surface is formed in a uniform manner and in a reduced period of time.

The electrochromic cell manufactured according to the preceding description is then completely sealed along all its edges, in order to:

a) prevent the entry of humidity from outside, b) prevent evaporation of the electrolyte solvent.

For this reason a sealing agent of the acrylic-based type is used, which is rapidly polymerized by UV light. For preference, the acrylic sealing agents found on the market under the brand name Loctite are used.

A second band of polysulphide or polyurethane or silicon is then applied over the first sealing band around the edge of the cell, with the aim of further improving external protection against humidity.

EXAMPLE 1

An electrochromic glass is produced using two sheets of float glass (flat or curved) as external walls;

the internal surfaces of said sheets of glass are coated with a suitable thickness of tin oxide, with a resistivity of 18 square ohms.

A thin layer 3 of tungsten oxide (WO3) with a thickness of 3500 Å is then deposited by evaporation on the coated surface of one of the two sheets of glass.

A thin layer 7 of $nV_2O_5/MoO_3$ with a thickness of 1700 Å, in which the ratio of vanadium oxide to molybdenum oxide is 0.5 is then deposited by evaporation on the coated surface of the second sheet of glass.

Lithium (50 millicoulombs per square cm) is incorporated into the layer 7 preferably by electrochemical method.

An electrolyte polymer is prepared, made up of lithium perchlorate dissolved in a solution of polymethylmethacrylate (PMMA) and propylene carbonate (PC), with the addition of a suitable amount of modifier, in which the ratio by weight of PC/PMMA is 3, which is subsequently reduced to 1.68 by means of a hot vacuum degassing operation; said electrolyte polymer 6 is then deposited using a screen-printing method on the surface formed by the electrolyte 3.

A reference electrode 10, made up of a layer 700 Å thick of gold evaporated onto a strip 4 6 micron thick of polyethylene terephthalate, is inserted for a length not exceeding 20 millimeters between the polymer 6 and the layer of tungsten oxide 3.

The strip 4 is arranged in such a way that the side coated with gold is in contact with the electrolyte polymer 6; furthermore the distance between the longest side and the edge of the glass parallel to said longest side is 10 mm.

Said reference electrode 10 measures the variation in electrochemical potential of the W03 as a function of the surface concentration of lithium. The variation of the potential is preferably contained between −1.2 volts and +1.2 volts.

After being joined together, the edge of the cell is sealed using a band of Loctite irradiated with 100 watt mercury lamps while the cell is moved at a speed of 0.36 mm/s.

A second band of polyurethane is then applied on the first one in order to guarantee a total barrier against vapor.

A constant current applied to the electrochromic glass manufactured as above generates a uniform colouring of the surface within a period of time not exceeding 1 minute.

I claim:

1. A transparent electrochromic glazing capable of varying its light transmission values throughout its surface area in response to the application of an electric field, said glazing consisting essentially of a first substrate of transparent glass material, a conductor layer applied on one surface of said substrate, a first transparent electrode applied in contact with said conductor layer, a transparent electrolyte in contact with said electrode, a second transparent electrode in contact with said electrolyte, a second conductor layer in contact with said second electrode and a second substrate of transparent sheet material on which said second conductor layer is applied, wherein said transparent electrolyte a polymer spreadable in contact with said first electrode, formed of lithium perchlorate dissolved in a solution of a propylene carbonate and polymethylmethacrylate in which the ratio by weight of propylene carbonate to polymethylmethacrylate is 1.5 to 1.8, comprising a reference electrode positioned between said first transparent electrode and said electrolyte polymer, said reference electrode comprising an insulating strip of polyethylene terephthalate in contact with said first transparent electrode having a width of 0.5 to 2 mm, a thickness lower than 10% of the thickness of said polymer electrolyte and a length in contact with said polymer electrolyte lower than 20 mm, and a conductive layer of gold in contact with said polymer electrolyte, having a thickness of substantially 700 Angstroms coated on said strip.

2. The device according to claim 1, in which by said application of an electric field a current is produced, which is a constant electric current and which causes said glazing to exhibit a uniform coloring in less than one minute.

3. The glazing according to claim 1 in the form of an automotive sunroof.

4. The glazing according to claim 1 in the form of a window for a building.

* * * * *